J. T. GRIFFIN AND W. A. TIMM.
ELECTRICALLY HEATED CONTAINER.
APPLICATION FILED SEPT. 24, 1920.

1,386,705.

Patented Aug. 9, 1921.
2 SHEETS—SHEET 1.

Inventors
James T. Griffin
William A. Timm
by G. M. Campbell
Atty.

J. T. GRIFFIN AND W. A. TIMM.
ELECTRICALLY HEATED CONTAINER.
APPLICATION FILED SEPT. 24, 1920.

1,386,705.

Patented Aug. 9, 1921.
2 SHEETS—SHEET 2.

Inventors
James T. Griffin
William A. Timm
by J. W. Campbell
Atty.

UNITED STATES PATENT OFFICE.

JAMES T. GRIFFIN, OF OAK PARK, AND WILLIAM A. TIMM, OF BERWYN, ILLINOIS, ASSIGNORS TO WESTERN ELECTRIC COMPANY, INCORPORATED, OF NEW YORK, N. Y., A CORPORATION OF NEW YORK.

ELECTRICALLY-HEATED CONTAINER.

1,386,705.   Specification of Letters Patent.   Patented Aug. 9, 1921.

Application filed September 24, 1920. Serial No. 412,481.

*To all whom it may concern:*

Be it known that we, JAMES T. GRIFFIN and WILLIAM A. TIMM, citizens of the United States, residing at Oak Park and Berwyn, respectively, in the county of Cook and State of Illinois, have invented certain new and useful Improvements in Electrically-Heated Containers, of which the following is a full, clear, concise, and exact description.

This invention relates to electrically heated containers, and the object of the invention in general is to provide a heated container of few and simple parts in which the heating element is made readily accessible for repair or replacement.

Figure 1:
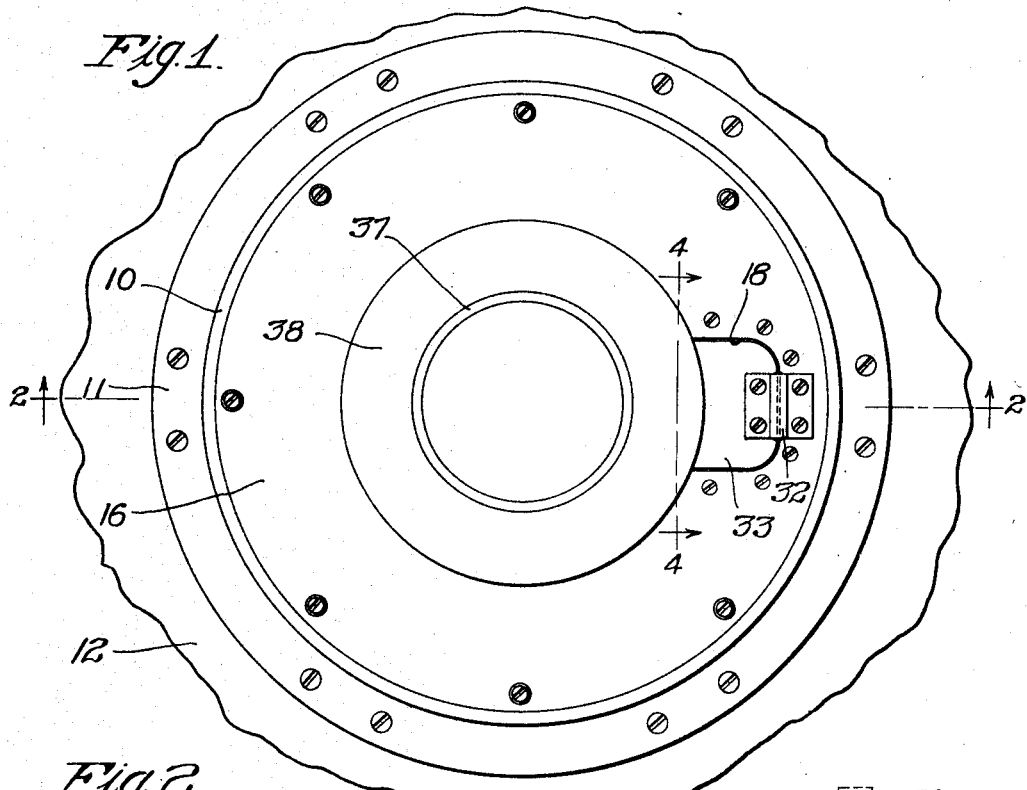
Figure 1 is a plan view of a heating pot embodying the features of this invention and shown mounted on a bench.
Figure 2:
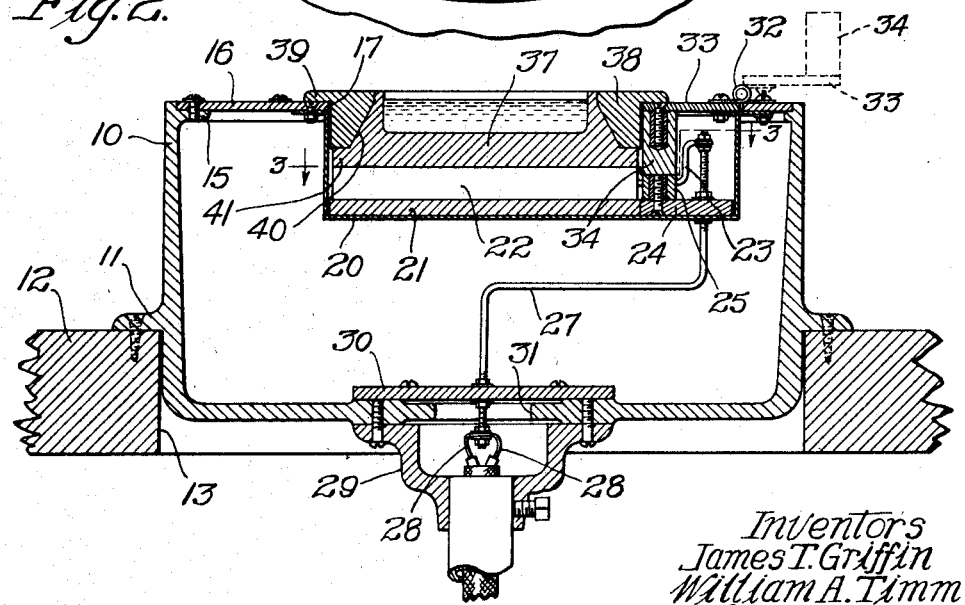
Fig. 2 is a vertical cross-sectional view on the line 2—2 of Fig. 1.
Figure 3:
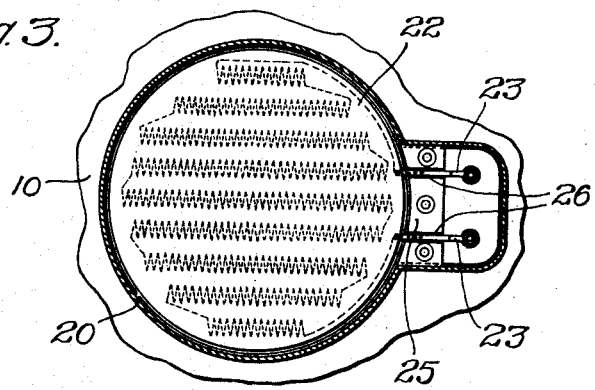
Fig. 3 is a partial horizontal section on the line 3—3 of Fig. 2.
Figure 4:
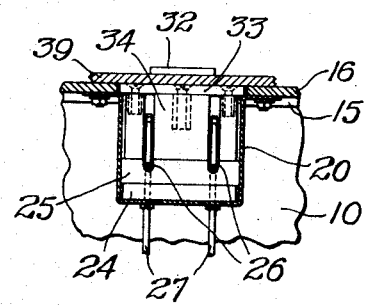
Fig. 4 is a partial vertical section on the line 4—4 of Fig. 1.
Figure 5:
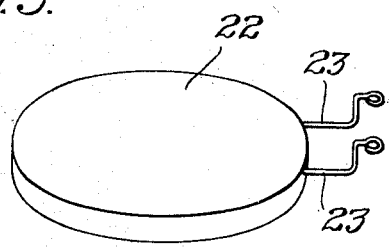
Fig. 5 is a perspective view of a heating unit.

As shown in the drawings, 10 represents a circular metal casing equipped with a flange 11 which is suitably secured to a bench 12 or any suitable supporting member provided with an opening 13 into which the bottom portion of the casing 10 projects. The top of the casing 10 is open and is equipped with an inside depressed flange 15 which supports a flat metal cover 16. The cover 16 is provided with an opening 17 which is cut back toward the periphery of the cover 16 at one portion, which is indicated at 18. Suitably supported and depending from the lower surface of the cover 16 and conforming to the size of the opening 17 with its cut back section therein is a metal supporting member 20. On the inside bottom surface of the member 20 rests a layer 21 of some suitable heat retaining material such as asbestos board. An electric heating unit 22, as best shown in Figs. 3 and 5, consisting of a suitable number of spiral turns of resistance wire embedded in some suitable material such as alundum cement is laid on the layer 21 of asbestos board with current carrying leads 23 projecting through the side thereof. The inside bottom surface of the cut back section 18 is also provided with a layer 24 of asbestos board to which is secured a block of asbestos board 25 provided with slots 26 which receive the leads 23 of the heating element 22. The leads 23 after passing through the slots 26 are suitably and removably secured to connecting leads 27 which connect with external current carrying leads 28 which are suitably secured to the casing 10 through a cup shaped supporting member 29 fastened to the bottom of the casing 10. The connecting leads 27 are held in position within the casing 10 at their lower ends by being secured to an asbestos board disk 30 fastened to the casing 10 over an opening 31 in its bottom wall and on the inside thereof and directly above the cup shaped member 29. At their upper ends the leads 27 are suitably secured to the layer 24 of asbestos board, through which they pass to connect with the leads 23 of the heating unit 22. The connecting leads 27 are suitably insulated from the metal supporting member 20 through which they pass. Secured to the cover 16 by a hinge 32 and within the cut back section 18 is a door 33 which when down, as shown in full lines on Fig. 2, forms a cover for the cut back portion of the member 20. Secured to the bottom surface of the door 33 is a stop 34 formed from asbestos board which, when the door 33 is closed, rests on the block 25. Placed within the supporting member 20 and resting on the heating element 22 and projecting a short distance above the cover 16 is a circular metal pot 37 within which the tin or other material to be heated or melted is placed. The pot 37 is of the same diameter as the heating unit 22 at its bottom portion, but with a smaller diameter at its top. A retaining ring 38 made of asbestos board and equipped with a flange 39 rests on the cover 16 and is provided with an opening 40 which conforms to the peripheral surface of the pot 37 above a flange 41 thereof upon which it rests, thereby tending to keep the heat generated in the heating unit 22 within the pot 37.

To replace the heating unit 22 when it becomes defective, it is necessary merely to lift the retaining ring 38 out of its position on the cover 16 and between the supporting member 20 and the pot 37, after which the pot 37 may be lifted off the heating unit 22. The door 33 may now be turned about its hinge 32 to the position shown in dotted lines in Fig. 2. This position of the door 33 gives access to the point of connection of the heating unit leads 23 and the connecting leads 27 which may be easily disconnected and the heating unit 22 removed and replaced.

Other parts of the heater, such as the layers 21 and 24 of asbestos board, connecting leads 27, and disk 30, may be readily replaced either during the removal of the heating unit 22 or by removing the cover 16 from the casing 10 by the removal of a few fastening screws and disconnecting the leads 27 from the leads 28.

What is claimed is:

1. In an electrically heated container, a supporting case, a cover therefor provided with an opening and equipped with a support for the entrance and support of a heating unit, a melting pot located above said heating unit, and a cover for a portion of the opening in said main cover and supported therefrom adapted upon being opened to expose the point of connection between external current carrying leads and the heating unit leads, thereby allowing the heating unit to be easily and quickly disconnected and replaced.

2. In an electrically heated container, a supporting case provided with openings at opposite sides, a cover for one of the openings provided with an opening and equipped with a support for the entrance and support of a heating unit, a melting pot located above said heating unit, a cover for a portion of the opening in said main cover hinged thereto and adapted upon being opened to expose the point of connection between external current carrying leads and the heating unit leads, thereby allowing the heating unit to be easily and quickly disconnected and replaced, and a closure for the second opening in said supporting case adapted to receive and support the external current carrying leads.

3. In an electrically heated container, a supporting case provided with a flange adapted to be secured to a support with a portion of said case below the surface of the support, a cover for said case provided with an opening for the entrance of a heating unit and a melting pot, a support therefor secured to said cover, and a cover for a portion of the opening in said main cover and supported therefrom adapted upon being opened to expose the point of connection between external current carrying leads and the heating unit leads, thereby allowing the heating unit to be easily and quickly disconnected and replaced.

4. In an electrically heated container, a supporting case, a cover therefor provided with an opening for the entrance of a heating unit and a melting pot, a support therefor which also forms a depressed closure for the opening in said cover secured thereto, and a cover for a portion of the opening in said main cover and secured at the surface thereof thereto and adapted upon being opened to expose the point of connection between external current carrying leads and the heating unit leads, thereby allowing the heating unit to be easily and quickly disconnected and replaced.

5. In an electrically heated container, an outer casing provided with a flange adapted to be secured to a support, a cover for said casing provided with an opening for the entrance of a heating unit and a melting pot, a basket-like member secured to the under side of said cover and forming a closure for the opening in said cover and also an inner casing and a support for said heating unit and melting pot, and a cover for a portion of the opening in said main cover hinged to said main cover and adapted upon being opened to expose the point of connection between external current carrying leads and the heating unit leads, thereby allowing the heating unit to be easily and quickly disconnected and replaced after the removal of the melting pot.

In witness whereof, we hereunto subscribe our names this 9th day of September A. D., 1920.

JAMES T. GRIFFIN.
WILLIAM A. TIMM.